(12) United States Patent
Hong

(10) Patent No.: US 8,171,784 B2
(45) Date of Patent: May 8, 2012

(54) GAS CYLINDER RESIDUAL GAS VOLUME INDICATOR

(75) Inventor: David Hong, Hong Kong (CN)

(73) Assignee: Winners Products Engineering Ltd., Hong Kong (CN)

( * ) Notice: Subject to any disclaimer, the term of this patent is extended or adjusted under 35 U.S.C. 154(b) by 281 days.

(21) Appl. No.: 12/612,679

(22) Filed: Nov. 5, 2009

(65) Prior Publication Data

US 2011/0100110 A1  May 5, 2011

(51) Int. Cl.
*G01F 17/00* (2006.01)
(52) U.S. Cl. .......... 73/149; 177/253; 177/256; 177/257; 177/262
(58) Field of Classification Search ............ 73/149
See application file for complete search history.

(56) References Cited

U.S. PATENT DOCUMENTS

| | | | | |
|---|---|---|---|---|
| 2,719,431 A | * | 10/1955 | Grant | 73/744 |
| 3,046,931 A | * | 7/1962 | Beer | 116/292 |
| 3,995,127 A | * | 11/1976 | Yanagi et al. | 200/52 R |
| 6,978,671 B1 | * | 12/2005 | Meggs et al. | 73/149 |
| 2003/0094049 A1 | * | 5/2003 | Delajoud | 73/744 |

* cited by examiner

*Primary Examiner* — Lisa Caputo
*Assistant Examiner* — Roger Hernandez-Prewitt
(74) *Attorney, Agent, or Firm* — Pai Patent & Trademark Law Firm; Chao-Chang David Pai

(57) ABSTRACT

A gas cylinder residual gas volume indicator includes a carrier having a weight-receiving part and a pressure-applying part, a hydraulic cylinder having a cylinder body holding a hydraulic fluid and a cylinder piston stopped against the pressure-applying part of the carrier and movable with the pressure-applying part relative to the cylinder body to force the hydraulic fluid out of the cylinder body according to the weight received from a gas cylinder by the weight-receiving part, a hydraulic mechanical type meter having an index rotatable by a hydraulic fluid, and an oil pipe for guiding the hydraulic fluid out of the hydraulic cylinder into the meter to rotate the index.

6 Claims, 9 Drawing Sheets

GAS CYLINDER RESIDUAL GAS VOLUME INDICATOR

BACKGROUND OF THE INVENTION (a) Field of the Invention

The present invention relates to means for indicating the residual gas volume of a gas storage means and more particularly to a gas cylinder residual gas volume indicator, which indicates the residual gas volume of a gas cylinder by means of a hydraulic mechanical operation.

(b) Description of the Prior Art

Regular gas ovens or gas grills use fuel gas for producing heat energy. Fuel gas must be contained in a gas cylinder (made of steel) for delivery, storage and use. However, a user may not know the actual residual gas volume. The fuel gas of a gas cylinder may be fully used up in the middle of baking or cooking, causing embarrassment and inconvenience. In view of this problem, meters capable of indicating the residual gas volume of a gas cylinder are created. These conventional indicating meters for residual gas volume are battery-operated electronic meters. However, electronic meters tend to be interfered by external noises. Further, electronic meters commonly have a complicated structure. Further, electronic meters are expensive and not always affordable for consumers.

SUMMARY OF THE INVENTION

The present invention has been accomplished under the circumstances in view. It is the main object of the present invention to provide a reliable and inexpensive gas cylinder residual gas volume indicator, which, by means of the combination of a carrier, a hydraulic cylinder, a meter and an oil pipe, allows a gas cylinder to be supported or hung on the carrier so that the meter can indicate the residual gas volume of the gas cylinder mechanically without consuming any extra energy.

To achieve this and other objects of the present invention, a gas cylinder residual gas volume indicator comprises a carrier having a weight-receiving part for receiving the weight of a gas cylinder and a pressure-applying part for moving a hydraulic cylinder according to the weight received by the weight-receiving part, a hydraulic cylinder having a cylinder body holding a hydraulic fluid and a cylinder piston stopped against the pressure-applying part of the carrier and movable by the pressure-applying part relative to the cylinder body to impart a pressure to the hydraulic fluid, a hydraulic mechanical type meter having an index rotatable by the hydraulic fluid, and an oil pipe connected between the hydraulic cylinder and the hydraulic mechanical type meter for guiding the hydraulic fluid out of the hydraulic cylinder into the meter to rotate the index.

Based on the design of the aforesaid gas cylinder residual gas volume indicator, a gas cylinder can be supported or hung on the weight-receiving part of the carrier. Thus, the weight of the gas cylinder and its internal fuel gas is applied to the weight-receiving part of the carrier, causing the pressure-applying part of the carrier to push the hydraulic cylinder piston of the hydraulic cylinder to move the internal hydraulic fluid out of the cylinder body through the oil pipe into the hydraulic mechanical type meter. Thus, the weight of the gas cylinder and its internal fuel gas is converted into a hydraulic fluid signal, which is transmitted through the oil pipe to the hydraulic mechanical meter to rotate the index, thereby providing an accurate, real-time indication of the residual gas volume of the gas cylinder. Therefore, the invention indicates the residual gas volume of the gas cylinder accurately and has the advantages of high reliability and low cost.

DETAILED DESCRIPTION OF THE PREFERRED EMBODIMENTS

Figure 1:
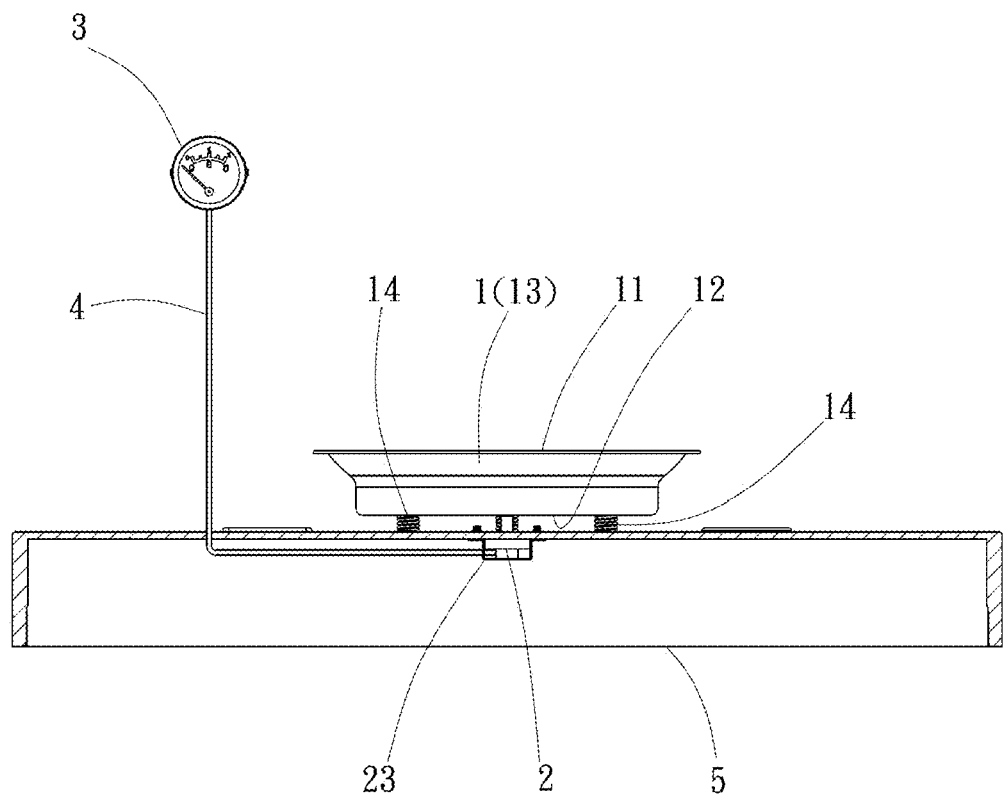
FIG. 1 is a schematic assembly view of a gas cylinder residual gas volume indicator in accordance with the present invention.
Figure 2:
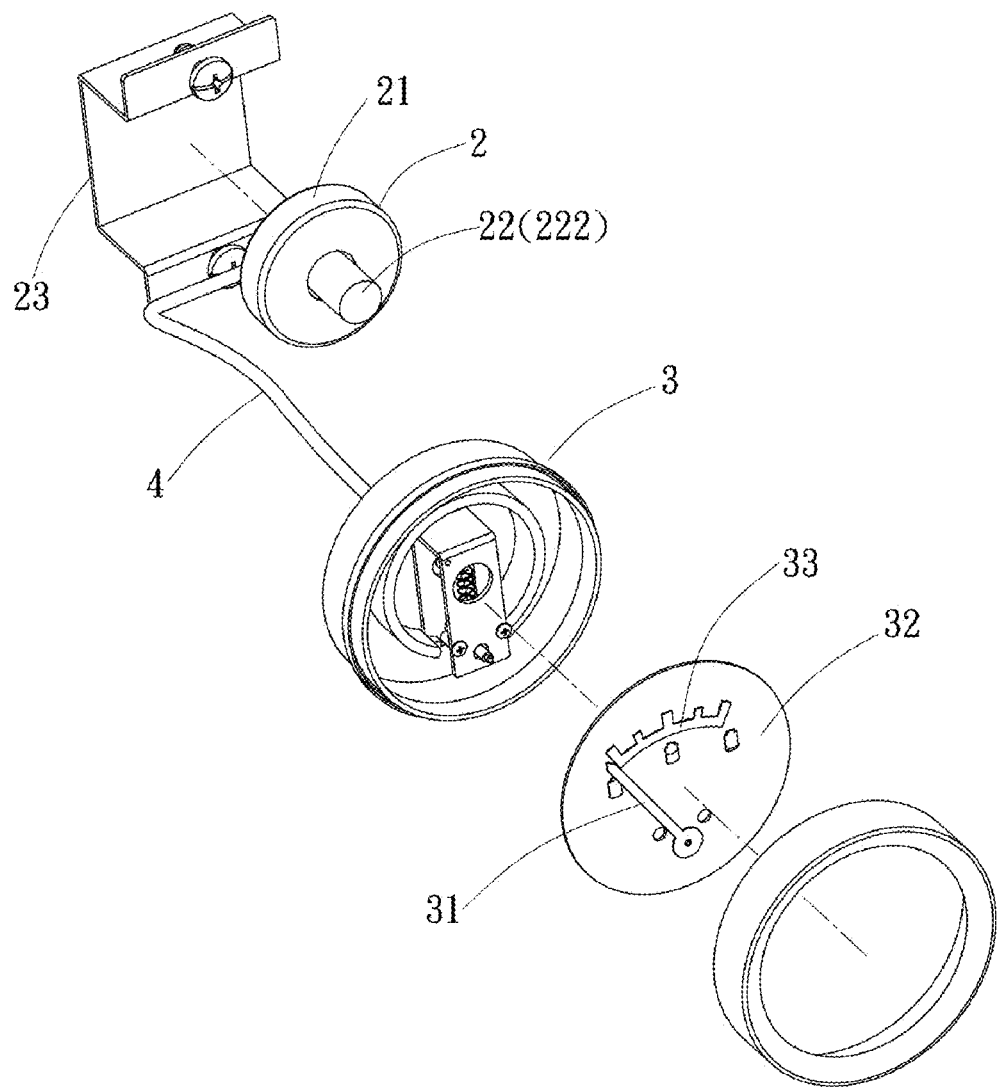
FIG. 2 is an exploded view in an enlarged scale of a part of FIG. 1.

As shown in FIGS. 1 and 2, a gas cylinder residual gas volume indicator in accordance with the present invention comprises a carrier 1, a hydraulic cylinder 2, a meter 3 and an oil pipe 4.

Figure 3:
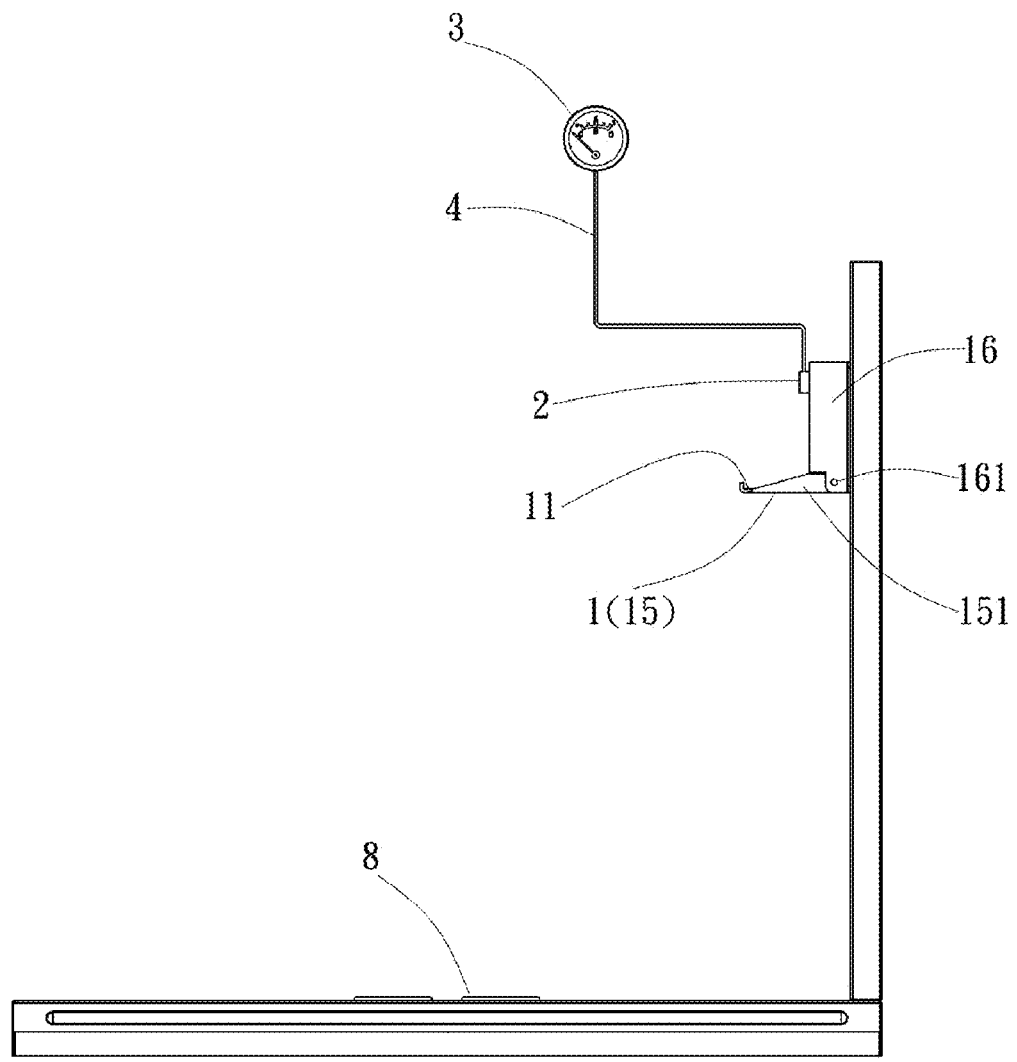
FIG. 3 is a schematic assembly view of an alternate form of the gas cylinder residual gas volume indicator in accordance with the present invention.
Figure 4:
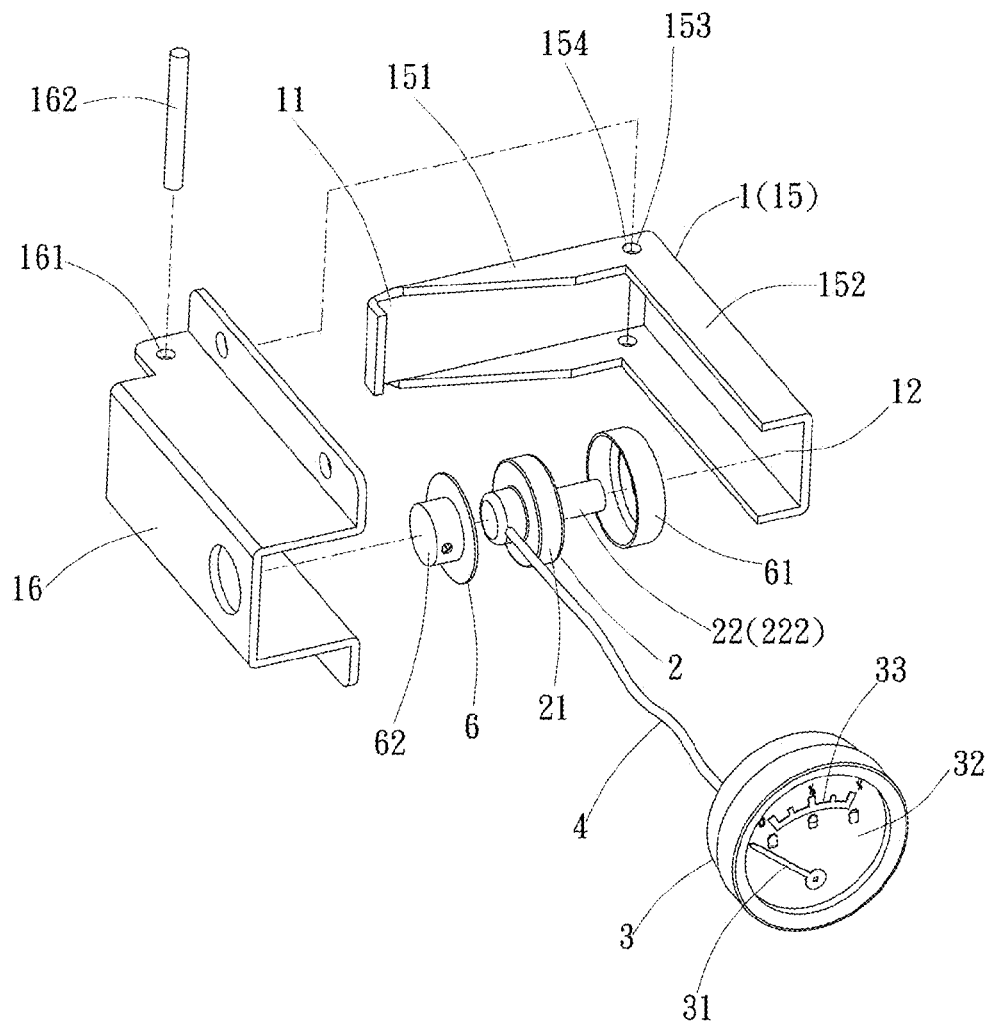
FIG. 4 is an exploded view in an enlarged scale of a part of FIG. 3.

The carrier 1, as shown in FIG. 1, FIG. 3 and FIG. 4, has a weight-receiving part 11 for receiving the weight of a gas cylinder and a pressure-applying part 12 for moving the hydraulic cylinder 2 according to the weight received by the weight-receiving part 11.

Figure 6:
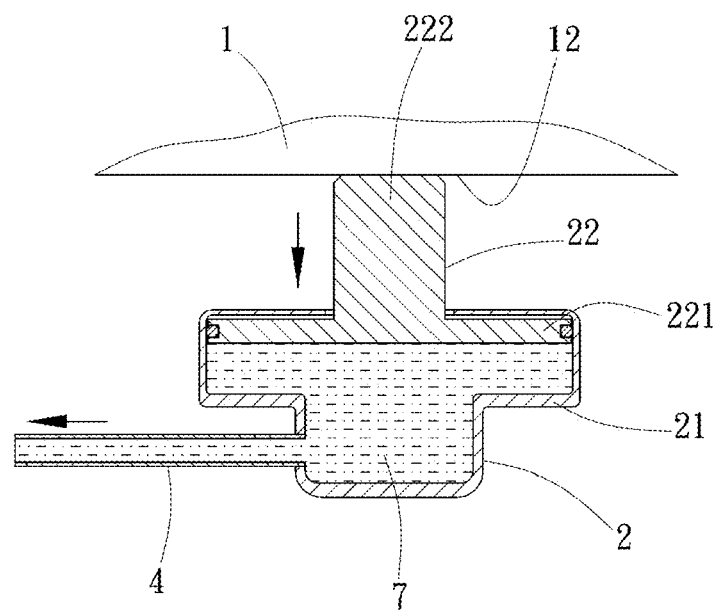
FIG. 6 is a sectional view of the hydraulic cylinder in operation in accordance with the present invention (I).

The hydraulic cylinder 2, as shown in FIG. 2, FIG. 4 and FIG. 6, comprises a cylinder body 21 and a hydraulic cylinder piston 22 axially slidably coupled to the cylinder body 21. The cylinder body 21 has filled therein a hydraulic fluid 7. The hydraulic cylinder piston 22 comprises a base 221 and a piston rod 222. The piston rod 222 extends out of one side of the cylinder body 21. The hydraulic cylinder 2 is disposed at one side relative to the pressure-applying part 12 of the carrier 1, keeping the distal end of the hydraulic cylinder piston 22 (piston rod 222) abutted against the pressure-applying part 12 of the carrier 1. Further, as shown in FIG. 2, the hydraulic cylinder 2 is mounted with a mounting plate 23. By means of the mounting plate 23, the hydraulic cylinder 2 is mounted on a place at one side relative to the pressure-applying part 12 of the carrier 1. As shown in FIG. 4, a guard shell 6 surrounds the hydraulic cylinder body 21. The guard shell 6 includes a shell body 61 and a cover 62, and is adapted to guard the hydraulic cylinder 2.

Figure 8:
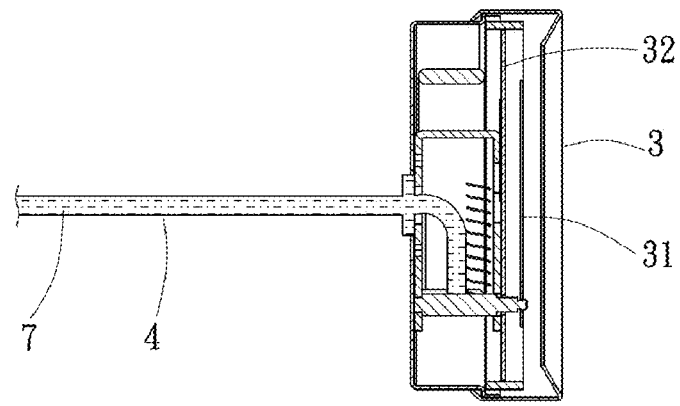
FIG. 8 is a sectional assembly view of the meter in accordance with the present invention.
Figure 9:
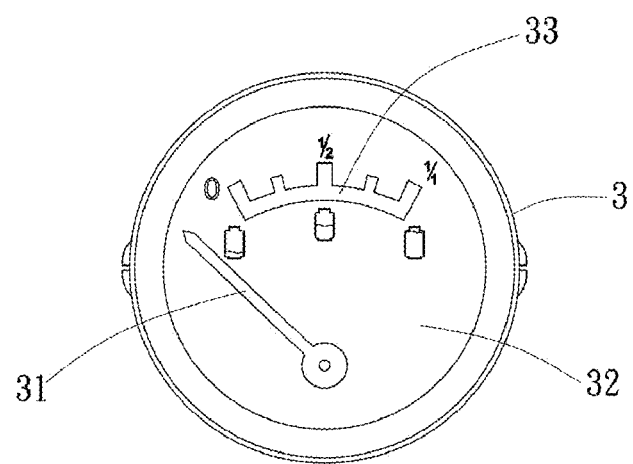
FIG. 9 is a front view of the meter in accordance with the present invention.

The meter 3, as shown in FIG. 8 and FIG. 9, is a hydraulic mechanical type meter, using a hydraulic fluid to move an index or pointer 31. The meter 3 can be a Bourdon-tube manometer or any other pressure gauge. Except the requisite mechanical structure, the meter 3 further comprises a dial 32 marked with graduations 33 for residual gas volume indication.

The oil pipe 4, as shown in FIG. 1 and FIG. 3, has its one end connected to the cylinder body 21 of the hydraulic cylinder 2 and its other end connected to the meter 3. By means of the hydraulic cylinder piston 22 moving the hydraulic fluid 7 out of the cylinder body 21 (see FIG. 5 and FIG. 6) to the meter 3, the pointer 31 is moved by the hydraulic fluid 7 (see FIG. 8).

Referring to FIG. 1 again, the carrier 1 comprises a movable carrier board 13. The movable carrier board 13 can be a circular disk or a disk of any other shape. The top wall of the movable carrier board 13 forms the weight-receiving part 11. The bottom wall of the movable carrier board 13 forms the pressure-applying part 12. The distal end of the hydraulic cylinder piston 22 (piston rod 222) of the hydraulic cylinder 2 is abutted against the bottom wall of the movable carrier board 13 of the carrier 1. The movable carrier board 13 is vertically movably connected to a base member 5. The hydraulic cylinder 2 is mounted on the base member 5 with the distal end of the hydraulic cylinder piston 22 (piston rod 222) of the hydraulic cylinder 2 abutted against the bottom wall of the movable carrier board 13. Further, spring members 14 are supported between the bottom wall of the movable carrier board 13 and the top wall of the base member 5. The spring members 14 can be spiral springs. When the pressure applied to the movable carrier board 13 decreases gradually, the spring members 14 push the movable carrier board 13 upwards relatively.

As shown in FIG. 3 and FIG. 4, the carrier 1 can be a pivoted hook member 15. The pivoted hook member 15 has a transverse arm 151 and a vertical arm 152 connected at right angle. The aforesaid weight-receiving part 11 is formed of a part of the front end of the transverse arm 151 remote from the vertical arm 152. The aforesaid pressure-applying part 12 is formed of a part of one side of the vertical arm 152. The distal end of the hydraulic cylinder piston 22 (piston rod 222) of the hydraulic cylinder 2 is abutted against the pressure-applying part 12 at one side of the vertical arm 152. The pivoted hook member 15 has pivot means 153 pivotally connected to a mounting frame 16 that is affixed to a base member 8. Thus, the hydraulic cylinder 2 is connected to a mounting frame 16 with the distal end of its hydraulic cylinder piston 22 (piston rod 222) abutted against the pressure-applying part 12 at one side of the vertical arm 152. According to this embodiment, the pivot means 153 is a pin hole 154. Further, the mounting frame 16 has a pin hole 161 near its bottom side. A pivot pin 162 is inserted through the pin hole 154 of the pivoted hook member 15 and the pin hole 161 of the mounting frame 16 to pivotally connect the pivoted hook member 15 to the mounting frame 16.

Figure 5:
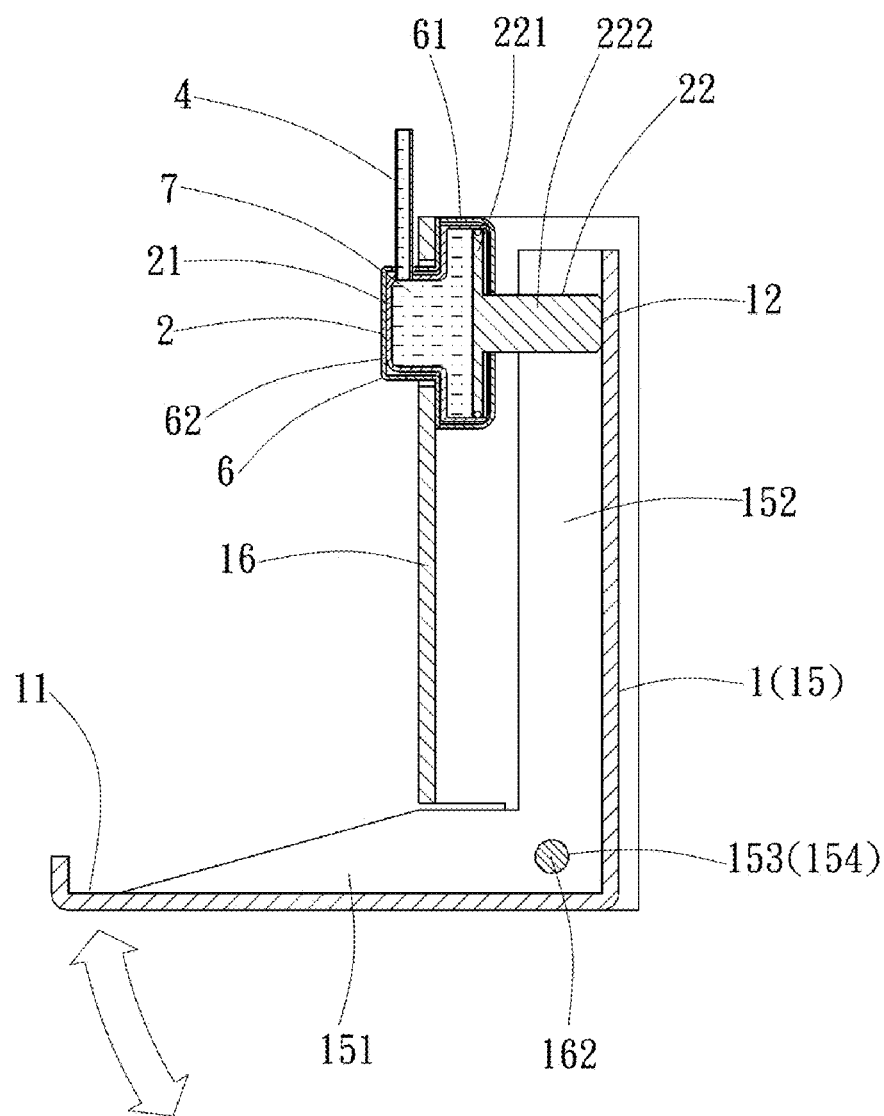
FIG. 5 is a sectional assembly view of FIG. 4.
Figure 7:
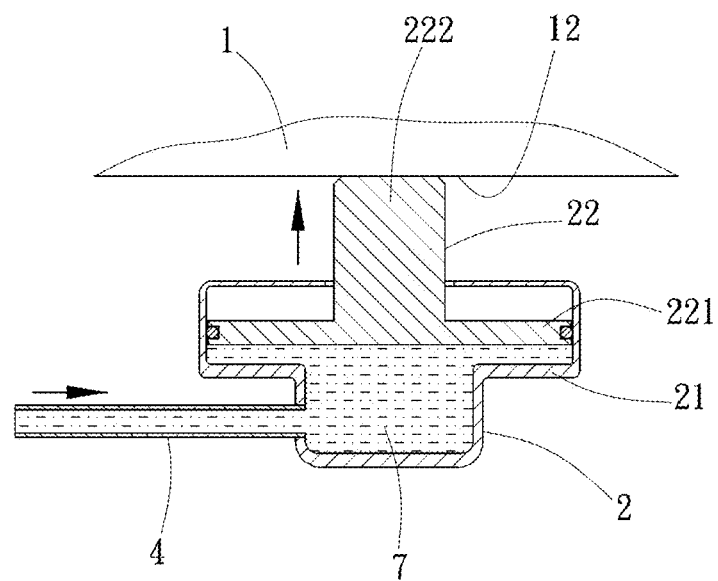
FIG. 7 is a sectional view of the hydraulic cylinder in operation in accordance with the present invention (II).
Figure 10:
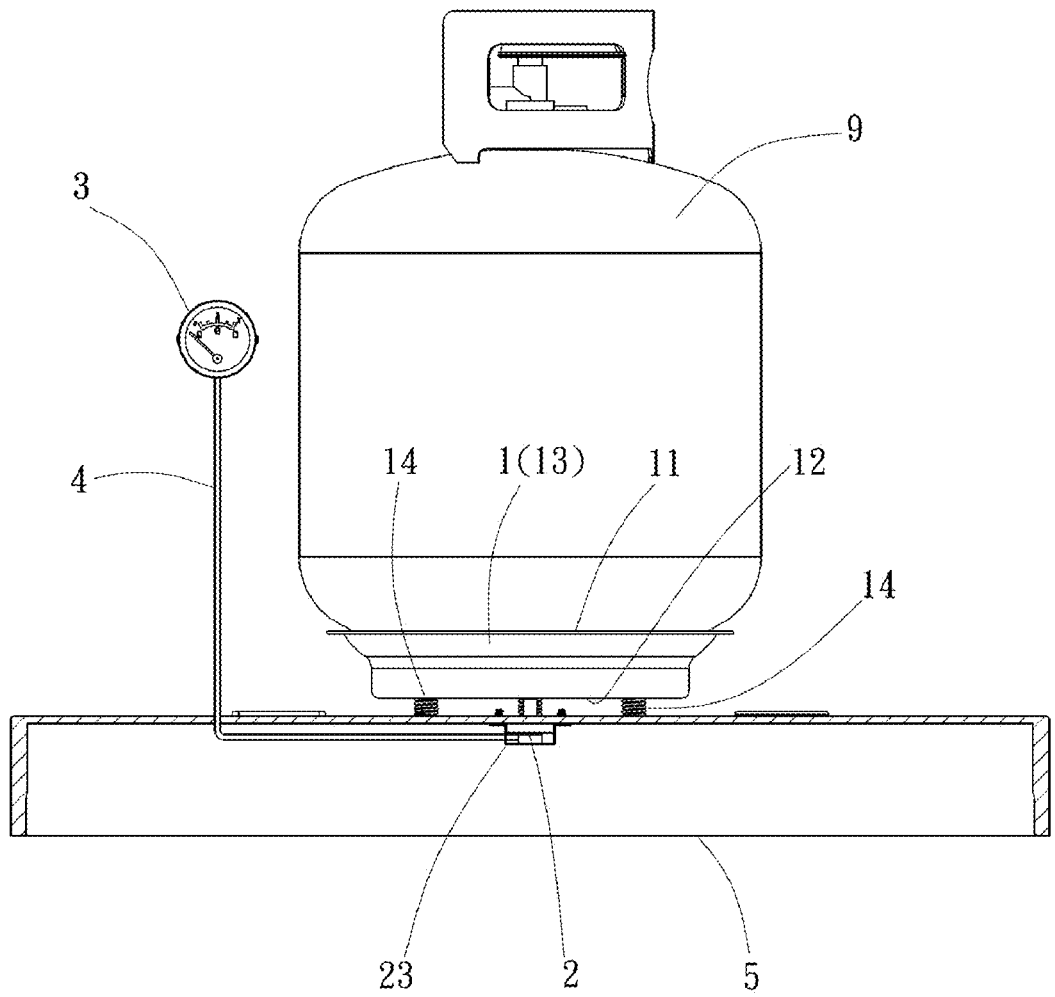
FIG. 10 is a schematic drawing showing an application example of the gas cylinder residual gas volume indicator shown in FIG. 1.
Figure 11:
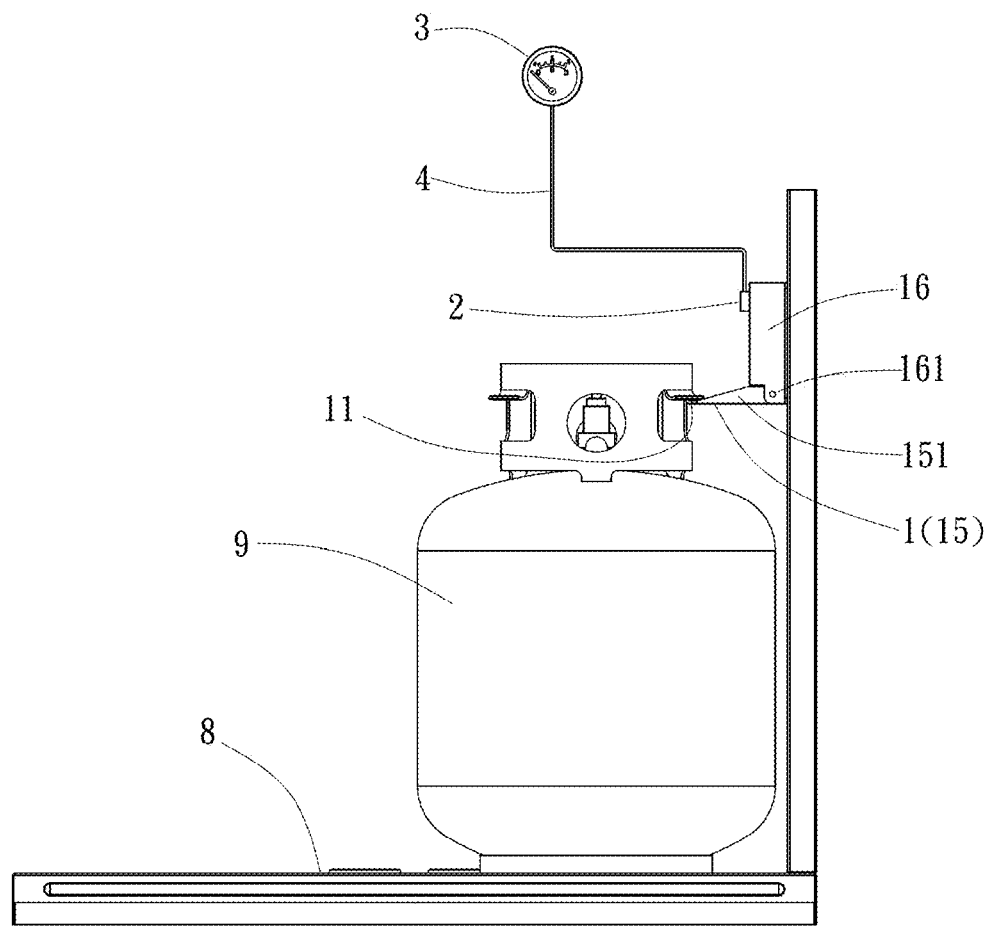
FIG. 11 is a schematic drawing showing an application example of the gas cylinder residual gas volume indicator shown in FIG. 3.

During application of the residual gas volume indicator, the residual gas volume indicator can be fastened to a gas oven or gas grill at a selected location. According to the application example shown in FIG. 10, the gas cylinder 9 is supported on the weight-receiving part 11. According to the application example shown in FIG. 11, the gas cylinder 9 is hung on the weight-receiving part 11 of the carrier 1. Thus, the weight of the gas cylinder 9 and its internal fuel gas is applied to the weight-receiving part 11 of the carrier 1, as shown in FIG. 5 and FIG. 6. At the same time, the pressure-applying part 12 of the carrier 1 pushes the hydraulic cylinder piston 22 of the hydraulic cylinder 2 to move the internal hydraulic fluid 7 out of the cylinder body 21 toward the oil pipe 4, and therefore the weight of the gas cylinder and its internal fuel gas is converted into a hydraulic fluid signal, which, as shown in FIG. 8 and FIG. 9, is transmitted through the oil pipe 4 to the meter 3 to rotate the pointer 31 of the meter 3 in one direction relative to the dial 32, thereby indicating the residual gas volume of the gas cylinder 9. On the contrary, as shown in FIG. 7, when the residual gas volume of the gas cylinder 9 is decreasing, the movable carrier 1 is relatively moved upwards by the spring members 14 to force the hydraulic fluid 7 backwards toward the inside of the hydraulic cylinder 2, and the pointer 31 of the meter 3 is relatively rotated in the reverse direction relative to the dial 32, providing a real-time indication of the residual gas volume of the gas cylinder 9. Thus, the invention accurately indicates the residual gas volume of the gas cylinder without consuming extra energy (power supply), and has the advantages of high reliability and low cost.

What is claimed is:

1. A gas cylinder residual gas volume indicator, comprising:
    a carrier,
    a hydraulic cylinder,
    a meter, and
    an oil pipe,
    wherein said carrier comprises a pivoted hook member, said pivoted hook member comprising a transverse arm and a vertical arm connected at right angle, said transverse arm having a front end forming a weight-receiving part for receiving the weight of a gas cylinder and said vertical arm having one side forming a pressure-applying part for moving the hydraulic cylinder according to the weight received by said weight-receiving part;
    said hydraulic cylinder comprises a cylinder body holding a hydraulic fluid and a cylinder piston stopped against said pressure-applying part of said carrier and movable by said pressure-applying part relative to said cylinder body to impart a pressure to said hydraulic fluid;
    said meter is a hydraulic mechanical type meter having an index rotatable by the hydraulic fluid of said hydraulic cylinder; and
    said oil pipe is connected between said hydraulic cylinder and said meter for guiding said hydraulic fluid out of said hydraulic cylinder body into said meter to rotate said index.

2. The gas cylinder residual gas volume indicator as claimed in claim 1, wherein said carrier further comprises a base member and a mounting plate mounted on said base member; said pivoted hook member comprises a pivot portion pivotally connected to said mounting plate; and said hydraulic cylinder is mounted on said mounting plate.

3. The gas cylinder residual gas volume indicator as claimed in claim 2, wherein said mounting plate has a pin hole disposed near a bottom side thereof; and said pivot portion is a pin hole cut through said pivoted hook member and pivotally connected to the pin hole of said mounting plate with a pivot pin.

4. The gas cylinder residual gas volume indicator as claimed in claim 1, wherein said meter is a Bourdon-tube manometer.

5. The gas cylinder residual gas volume indicator as claimed in claim 4, wherein said Bourdon-tube manometer comprises a dial having graduations; and said index is rotatable relative to the graduations of said dial to indicate the residual gas volume of said gas cylinder.

6. The gas cylinder residual gas volume indicator as claimed in claim 1, further comprising a guard shell surrounding the cylinder body of said hydraulic cylinder.

* * * * *